United States Patent [19]

Haugland

[11] Patent Number: 4,779,779
[45] Date of Patent: Oct. 25, 1988

[54] LUGGAGE CONTAINER ACCESSORY FOR DETACHABLY MOUNTING ON THE EXTERIOR OF A VEHICLE

[76] Inventor: Richard M. Haugland, 520 W. Gleneagles Dr., Phoenix, Ariz. 85023

[21] Appl. No.: 172,990

[22] Filed: Mar. 18, 1988

Related U.S. Application Data

[63] Continuation of Ser. No. 26,200, Mar. 16, 1987, abandoned.

[51] Int. Cl.$^4$ ............................................... B60R 9/04
[52] U.S. Cl. .................................... 224/328; 224/318; 410/97; 296/136; 150/52 K
[58] Field of Search ................... 296/136; 410/12, 34, 410/50, 55, 81, 96, 97, 98, 100, 101, 102, 106, 109, 110, 112, 113; 224/273, 309, 311, 314, 318, 320, 328, 324, 329, 330, 331; 150/52 R, 52 K; 190/19, 28; 248/499

[56] References Cited

U.S. PATENT DOCUMENTS

| | | | |
|---|---|---|---|
| 1,798,872 | 3/1931 | Ellis | 224/331 X |
| 2,109,571 | 3/1938 | LeBoeut | 224/328 X |
| 2,440,821 | 5/1948 | Godwin | 224/328 X |
| 2,789,743 | 4/1957 | Waldman | 224/314 |
| 2,920,802 | 1/1960 | Cook | 224/328 |
| 2,937,774 | 5/1960 | Roberts | 414/462 |
| 3,000,418 | 9/1961 | Bitting | 150/52 R |
| 3,000,419 | 9/1961 | Morrison | 150/52 K |
| 3,393,845 | 7/1968 | Gilbreath | 224/318 |
| 3,565,305 | 2/1971 | Bilokin, Jr. | 224/328 |
| 4,047,650 | 9/1977 | Domingos | 224/236 X |
| 4,050,614 | 9/1977 | Simpson | 224/328 |
| 4,151,938 | 5/1979 | Barker et al. | 224/236 X |
| 4,283,083 | 8/1981 | Johnson | 296/24 R |
| 4,288,188 | 9/1981 | Smith | 410/97 |
| 4,434,922 | 3/1984 | Brandsen et al. | 224/314 |
| 4,461,413 | 7/1984 | Hoerner | 224/311 |
| 4,473,178 | 9/1984 | Bott | 224/324 |
| 4,596,418 | 6/1986 | Koh | 296/136 |
| 4,601,419 | 7/1986 | Bird | 224/318 |

FOREIGN PATENT DOCUMENTS

| | | | |
|---|---|---|---|
| 1106809 | 8/1981 | Canada | 224/314 |
| 1953620 | 5/1971 | Fed. Rep. of Germany | 224/318 |
| 2442104 | 3/1975 | Fed. Rep. of Germany | 224/314 |
| 159831 | 7/1957 | Norway | 224/328 |
| 8404074 | 10/1984 | PCT Int'l Appl. | 224/328 |

Primary Examiner—Henry J. Recla
Assistant Examiner—Ernest G. Cusick
Attorney, Agent, or Firm—James H. Phillips

[57] ABSTRACT

A luggage container accessory is disclosed which includes a unitary enclosure assembly fabricated from a light weight and water repellent flexible material such as urethane treated nylon. The enclosure assembly includes top, bottom and front panels as well as a left side panel, a right side panel and a rear panel which each depend upwardly from the bottom panel. A zipper is provided near the top of the left, right and rear panels for selectively coupling and decoupling the side and rear panels to the top. A skirt depends downwardly from the top panel to conceal and provide weather protection to the zipper region. The skirt is secured in place to the side and rear panels (by snaps or the like) to maintain the weather resistant integrity of the enclosure assembly. The enclosure assembly is attached to the vehicle by a first pair of straps extending transversely across the top panel and a second pair of straps extending fore and aft across the top panel. A pair of buckles are disposed intermediate the length of each strap such that the end of each strap may be passed through a loop fixture positioned within the vehicle and then passed back to one of the buckles to complete the installation process. Preferably, protecting strips of soft rubber are provided across the outer surface of the bottom panel to raise the it off the vehicle finish to prevent marring the finish.

2 Claims, 1 Drawing Sheet

U.S. Patent  Oct. 25, 1988  4,779,779
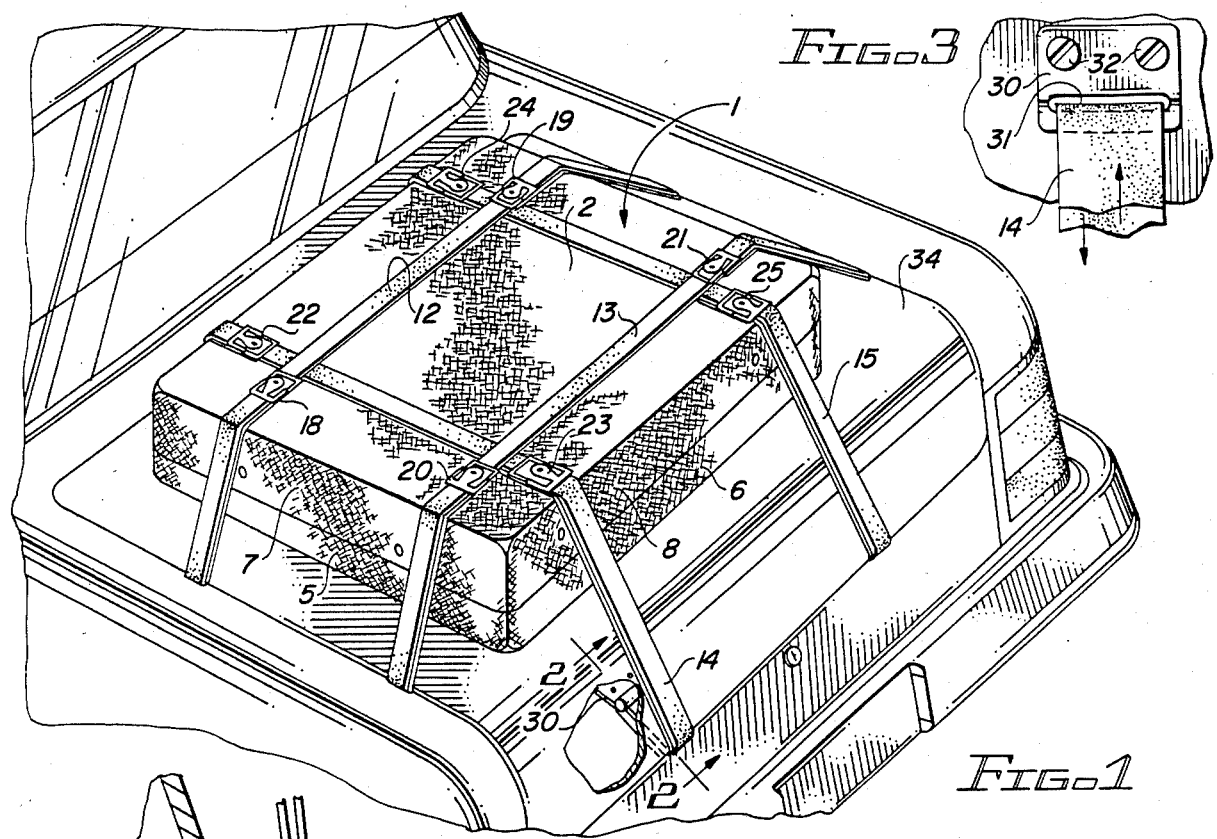
Fig. 1
Fig. 3
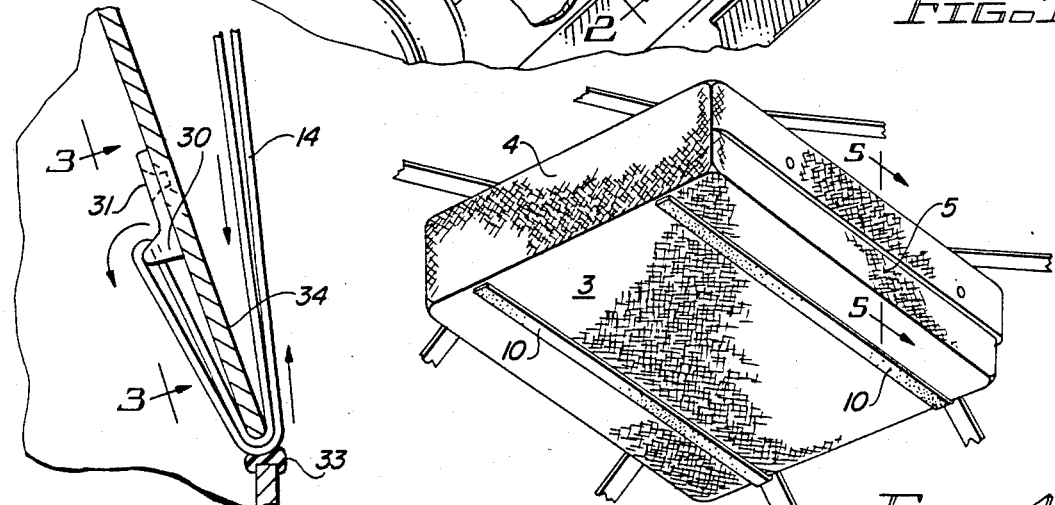
Fig. 2
Fig. 4
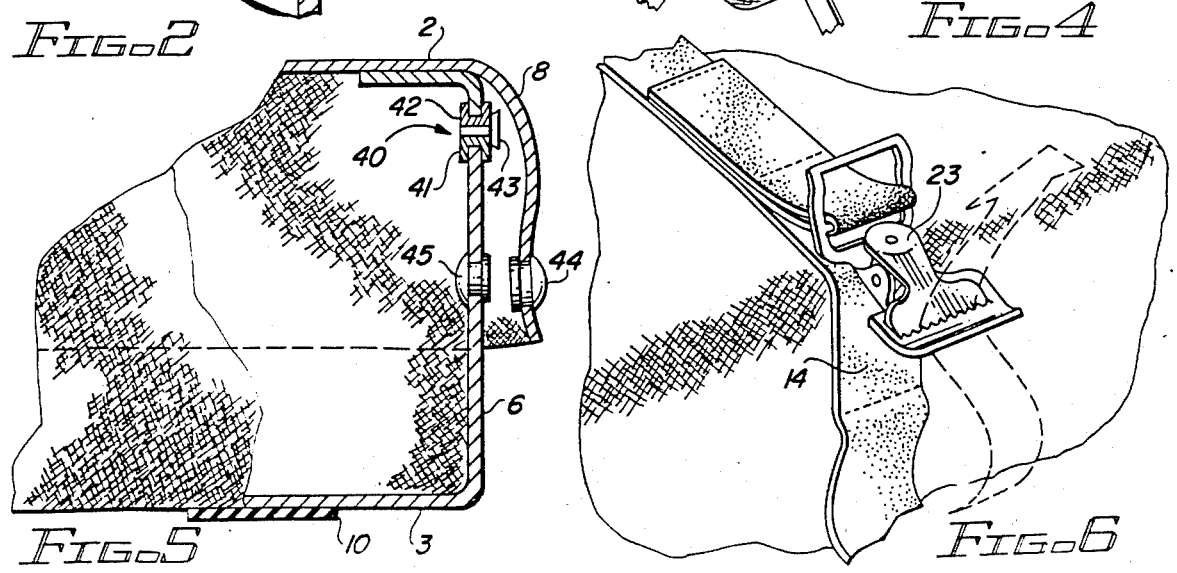
Fig. 5
Fig. 6

LUGGAGE CONTAINER ACCESSORY FOR DETACHABLY MOUNTING ON THE EXTERIOR OF A VEHICLE

This application is a continuation of application Ser. No. 26,200, filed Mar. 16, 1987, now abandoned.

FIELD OF THE INVENTION

This invention relates to the vehicular accessory arts and, more particularly, to a luggage container which is adapted to be removably affixed to the exterior of a vehicle.

BACKGROUND OF THE INVENTION

Vehicles, particularly automobiles and vans, are often used to undertake trips in which it is desired to carry more luggage than can be readily accommodated within the space provided within the vehicle interior such as the passenger compartment and the trunk. As a result, there have been provided in the past a number of "outboard" containers adapted to be removably affixed to the roof or trunk surface of the vehicle to transport the excess baggage. Such containers are readily available from rental organizations and, in addition, considerable thought and effort directed to the basic problem have resulted in the accessories disclosed in U.S. Pat. Nos.: 2,920,802; 2,937,774; 3,000,418; 3,000,419; 3,565,305; 4,050,614; and 4,283,083. Each of these references disclose accessory luggage containers which achieve the objects of the respective inventions. However, each is subject to one or more of the following drawbacks: heavy and unwieldy, difficult to emplace and remove luggage, not sufficiently weather resistant, not sufficiently reliably closable, employs difficult or unreliable securement means for affixing the accessory to a vehicle, a tendency to mar the vehicle finish, undue wind resistance in use, difficult to store when not in use, requires a luggage rack and has a rigidly defined exterior shape.

My invention is directed to resolving all the foregoing problems.

OBJECTS OF THE INVENTION

It is therefore a broad object of my invention to provide an improved accessory luggage carrier adapted to be detachably affixed to the roof or trunk of a vehicle.

It is another object of my invention to provide such a luggage accessory which is light weight and very easy to install, remove and store.

It is yet another object of my invention to provide such a luggage accessory which is reliably weather resistant and which is easy to load and unload.

It is still yet another object of my invention to provide such a luggage accessory which is fabricated from a flexible material to accommodate various luggage assortments and to permit the minimization of wind drag in use while being storable in a small volumetric space.

SUMMARY OF THE INVENTION

These and other objects of my invention are achieved by providing a luggage container accessory which includes a unitary enclosure assembly fabricated from a light weight and water repellent flexible material such as urethane treated nylon. The enclosure assembly includes top, bottom and front panels as well as a left side panel, a right side panel and a rear panel which each depend upwardly from the bottom panel. A zipper is provided near the top of the left, right and rear panels for selectively coupling and decoupling the side and rear panels to the top. A skirt depends downwardly from the top panel to conceal and provide weather protection to the zipper region. The skirt is secured in place to the side and rear panels (by snaps, hook and loop assemblies, or the like) to maintain the weather resistant integrity of the enclosure assembly. The enclosure assembly is attached to the vehicle by a system which includes a first pair of straps extending transversely across the top panel and a second pair of straps extending fore and aft across the top panel. A pair of buckles are disposed intermediate the length of each strap such that the end of each strap may be passed through a loop fixture positioned within the vehicle and then passed back to one of the buckles for buckling therewith to complete the installation process. Preferably, protecting strips of soft rubber are provided across the outer surface of the bottom panel to raise the bottom panel off the vehicle finish to insure its protection.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a partially cut away pictorial view from the left rear illustrating my luggage accessory in a typical installation atop the trunk of a vehicle;

FIG. 2 is a cross sectional view taken along the lines 2—2 of FIG. 1 illustrating a loop fixture utilized in one particularly effective means for affixing the accessory to a vehicle;

FIG. 3 is a view taken along the lines 3—3 of FIG. 2 to further illustrate the loop fixture shown therein;

FIG. 4 is a view from beneath of my luggage accessory particularly illustrating a vehicle finish protection feature;

FIG. 5 is a partially cutaway cross sectional view taken along the lines 5—5 of FIG. 4 illustrating certain closure and weather protection components and features of the invention; and FIG. 6 is a detailed view of one presently preferred buckle assembly used in securing the accessory to a vehicle.

DETAILED DESCRIPTION OF THE INVENTION

Referring now to both FIGS. 1 and 4, it will be seen that the luggage container accessory of the present invention incorporates a unitary enclosure assembly 1 which includes a top panel 2 and a bottom panel 3 as well as a front panel 4 which connects (and is integral with) the top and bottom panels. A left side panel 5, a rear panel 6 and a right side panel (out of view in the FIGS., but the mirror image of the left side panel 5) depend upwardly from the bottom panel 3 and cooperate to define the periphery of the enclosure assembly 1.

Depending downwardly from the top panel 2 are a left skirt section 7, a rear skirt section 8 and a right skirt section (out of view in the FIGS., but a mirror image of the left skirt section 7). The left, right and rear panels are integral with the bottom section 3 and with one another. Similarly, the left, rear and right skirt sections are integral with the top panel 2 and with one another. All components of the unitary enclosure assembly so far described are preferably fabricated from a light weight, weather resistant flexible material, and a presently preferred material for these components is urethane treated nylon which has both excellent wear characteristics and has proven to be especially suitable in protecting enclosed luggage from the elements.

Referring particularly to FIG. 4, strips 10 may optionally be provided across the bottom panel 3 to afford a greater degree of protection to the finish of the vehicle with which the luggage accessory is employed. A relatively soft rubber has been found to be a good choice for the material from which the finished protecting strips 10 may be fabricated, and they may be affixed to the bottom panel 3 by adhesives or may be sewn on as may be preferred.

A very reliable enclosure securement system is provided to removably affix the unitary enclosure assembly to a vehicle, and (referring particularly to FIG. 1) the securement system generally includes a first pair of straps 12, 13 extending transversely across the top panel 2 and a second pair of straps 14, 15 extending fore and aft across the top panel 2. A pair of buckles are disposed at separated positions intermediate the length of each strap. Thus, the strap 12 carries the buckles 18, 19; the strap 13 carries the buckles 20, 21; the strap 14 carries the buckles 22, 23; and the strap 15 carries the buckles 24, 25.

When the luggage container is utilized with a vehicle having a luggage rack installed, it may be affixed to the vehicle by simply passing the strap ends around appropriate support elements integral with the luggage rack (not shown) with each strap end brought back and inserted through its respective buckle in the conventional fashion. Similarly, a conventional rain gutter attachment element incorporating a loop may be used in conjunction with the straps and buckles to affix the luggage container accessory to the roof of a vehicle by passing the respective strap ends through the adapter loops (not shown) in the well-known fashion and securing them to their respective buckles.

However, particular attention is directed to the especially secure and convenient system for removably affixing the unitary enclosure assembly to a vehicle (preferably to the trunk lid) in such a manner that the vehicle finish is not marred by either the securement apparatus or the enclosure itself. Referring to FIGS. 1, 2 and 3, a plurality of loop fixtures, represented by the loop fixture 30, are installed within the vehicle in positions appropriate to receive one end of one of the straps 12, 13, 14, 15. Thus, loop fixture 30 is aligned to receive one end of strap 14. Referring particularly to FIGS. 2 and 3, loop fixture 30 includes an eye 31 through which the end of the strap 14 may be inserted and brought back along its length for insertion and buckling into and buckling with the buckle 23. Preferably, loop fixture 30 is permanently emplaced (as by screws 32) within the vehicle, and the most convenient area for an automobile is within the trunk. Thus, as best shown in FIG. 2, each strap end may be brought into the vehicle interior, passed through its individually provided loop fixture, and back up past the resilient seal 33 for the deck lid 34 to engage its buckle (see FIG. 6). By individually appropriately tightening the straps 12, 13, 14, 15 after the strap ends have been passed through their respective loop fixtures and into their respective buckles, the profile of the exterior of the unitary enclosure assembly 1 may be made to more or less conform with the contained load to minimize its bulk and hence its wind resistance.

A particular problem well known with respect to the prior art accessory luggage containers is the difficulty of reliably weather sealing the contents against the elements. FIG. 5 illustrates the reliable weather-protected enclosure features of the present invention. As previously mentioned, left, right and rear panels depend upwardly from the bottom panel 3. Thus, as shown in FIG. 5, the rear panel 6 is integral with and depends upwardly from the bottom panel 3. The rear skirt section 8, as also previously noted, extends outwardly from and depends downwardly from the top panel 2. A zipper 40 extends continuously around the left, rear and right sides of the enclosure assembly 1. More particularly, the zipper 40 includes a first side 41 extending continuously along the upper edges of the left, right and rear panels and a second side 42 extending continuously along the left, right and rear edges of the top panel 2. A closure member 43 is conventionally provided for selectively coupling and decoupling the first and second zipper sides by pulling it along the zipper length.

Effective weather resistance is obtained by the action of the skirt sections (such as the skirt section 8 shown in FIG. 5) which not only normally drape over the zipper region, but are also detachably positively fixed in place by a securement assembly such as a plurality of mating snap fastener sub-assemblies 45, 44 distributed along the length of the left, right and rear panels and the left, right and rear skirts. Alternatively, any adaptable skirt securement feature can be incorporated, one example being the well-known hook and loop elements which mate under pressure and may be simply pulled apart.

In order to accommodate items which are not contained in conventional luggage, optional inserts (not shown) may be provided to hold the sides of the accessory rigid.

When the subject luggage accessory is not in use, it may be removed from the vehicle and rolled into a compact bundle for storage.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:
1. A luggage container accessory system comprising:
    (A) a vehicle, said vehicle:
        (1) including a plurality of loop fixtures installed within said vehicle and affixed thereto, each of said loop fixtures including a strap-receiving eye;
            a. each of said loop fixtures remaining stationary with respect to said vehicle in both operative and non-operative conditions of said loop fixtures; and
            b. each of said loop fixtures being disposed totally within said vehicle in both operative and non-operative conditions of said loop fixtures; and
        (2) having a finished exterior;
    (B) a unitary enclosure assembly, said enclosure assembly including:
        (1) a bottom panel having front, rear, left and right edges and inner and outer surfaces;

(2) a top panel having front, rear, left and right edges;

(3) a front panel connecting said front edge of said bottom panel and said front edge of said top panel;

(4) a left side panel depending upwardly from said left edge of said bottom panel, said left side panel further having an upper section terminating in an upper edge;

(5) a right side panel depending upwardly from said right edge of said bottom panel, said right side panel further having an upper section terminating in an upper edge;

(6) a rear panel depending upwardly from said rear edge of said bottom panel, said rear panel further having an upper section terminating in an upper edge;

(7) all said panels cooperating to define the periphery of said enclosure assembly;

(8) all said panels being fabricated from a fabric treated with a water repellent material;

(9) a zipper having:
   a. a first side extending continuously along said upper edges of said left, right and rear panels;
   b. a second side extending continuously proximate said left, right and rear edges of said top panel; and
   c. a closure member for selectively coupling and decoupling said first and second zipper sides;

(10) left, right and rear skirts depending downwardly, respectively, from said left, right and rear edges of said top panel and extending, respectively, over said upper sections of said left, right and rear panels; and

(11) skirt securement means for detachably affixing said left, right and rear skirts to said left, right and rear panels to conceal and afford weather protection to said zipper, said skirt securement means including a plurality of mating snap sub-assemblies distributed along the length of said upper sections of said left, right and rear panels and correspondingly along the length of said left, right and rear skirts; and (C) an enclosure securement system for removably securing said unitary closure assembly to said vehicle, said enclosure securement system including:
   (1) a first pair of straps extending transversely across said top panel, each said strap of said first pair having first and second ends;
   (2) a pair of buckles disposed at separated positions intermediate the length of each strap of said first pair of straps;
   (3) a second pair of straps extending fore and aft across said top panel, each said strap of said second pair having first and second ends;
   (4) a pair of buckles disposed at separated positions intermediate the length of each strap of said second pair of straps; and
   (5) each of said plurality of loop fixtures being positioned within said vehicle to receive one end of one of said straps;

whereby, each end of each said strap may be passed through said eye of one of said loop fixtures and passed back to one of said buckles disposed on said respective strap for buckling therewith thereby removably securing said unitary enclosure assembly to said vehicle.

2. The luggage container accessory of claim 1 which further includes a plurality of vehicle protecting strips extending across said outer surface of said bottom panel to raise said bottom panel off said exterior of said vehicle to thereby protect said finish thereof.

* * * * *